United States Patent [19]

Robb et al.

[11] Patent Number: 4,469,319
[45] Date of Patent: Sep. 4, 1984

[54] LARGE DOCUMENT RESTACKING SYSTEM

[75] Inventors: Frank J. Robb, Fairport; Fred F. Wilczak, Pittsford, both of N.Y.

[73] Assignee: Xerox Corporation, Stamford, Conn.

[21] Appl. No.: 443,801

[22] Filed: Nov. 22, 1982

[51] Int. Cl.³ .............................................. B65H 31/20
[52] U.S. Cl. ..................................... 271/3.1; 271/171; 271/188; 271/209; 271/223
[58] Field of Search ................. 271/3.1, 171, 188, 209, 271/223, 224

[56] References Cited

U.S. PATENT DOCUMENTS

| | | | |
|---|---|---|---|
| 2,423,691 | 7/1947 | Domville, Jr. et al. | 271/86 |
| 3,632,107 | 1/1972 | Rehm et al. | 271/71 |
| 3,790,157 | 2/1974 | Crawford et al. | 270/62 |
| 3,793,950 | 2/1974 | Kaneko | 271/209 X |
| 4,166,614 | 9/1979 | Hamlin et al. | 271/3.1 |
| 4,270,746 | 6/1981 | Hamlin | 271/98 |
| 4,278,344 | 7/1981 | Sahay | 355/14 SH |
| 4,286,870 | 9/1981 | Silverberg | 355/76 |
| 4,336,929 | 6/1982 | Hanzlik | 271/20 |
| 4,350,332 | 9/1982 | Knight | 271/188 |
| 4,361,319 | 11/1982 | Ikeda | 271/209 X |

OTHER PUBLICATIONS

Hanzlik, Edward W. C., "Variable Corrugation Vacuum Corrugating Sheet Feeder", Xerox Disclosure Journal, vol. 6, No. 4, Jul./Aug. 1981.
Kobus, Gerhard S., "Variable Sheet Deflector For Document Restacking", Xerox Disclosure Journal, vol. 6, No. 5, Sep./Oct. 1981.
Andrews, Albert E., "Document Restack Pneumatic Control", Xerox Disclosure Journal, vol. 7, No. 2, Mar./Apr. 1982.
Hanzlik, Edward W. C., "Belt-On-Drum Output For Recirculating Document Handler", Xerox Disclosure Journal, vol. 7, No. 4, Jul./Aug. 1982.

*Primary Examiner*—Richard A. Schacher

[57] ABSTRACT

In a sheet stacking apparatus, especially a recirculating document handler for recirculating document sheets for precollation copying at a copier platen to and from a stack in a document tray without obstructing access to the document tray, with restacking edge guides repositionable to accommodate stacking different sheet sizes and a restacking feeder for restacking the document sheets in the tray within the restacking edge guides by feeding each document in over the top of the stack from one edge and releasing the document to restack, there is provided automatically varying corrugation restacking apparatus enabling controlled restacking for recirculative copying of large flimsy documents such as Japanese B4 size sheets compatibly with normal document sizes having sheet corrugating members repositioned by movement of a repositionable restacking edge guide into a position to restack such large sheets and automatically providing in coordination therewith additional sheet corrugation in response to the flimsiness and size of the sheet.

11 Claims, 5 Drawing Figures

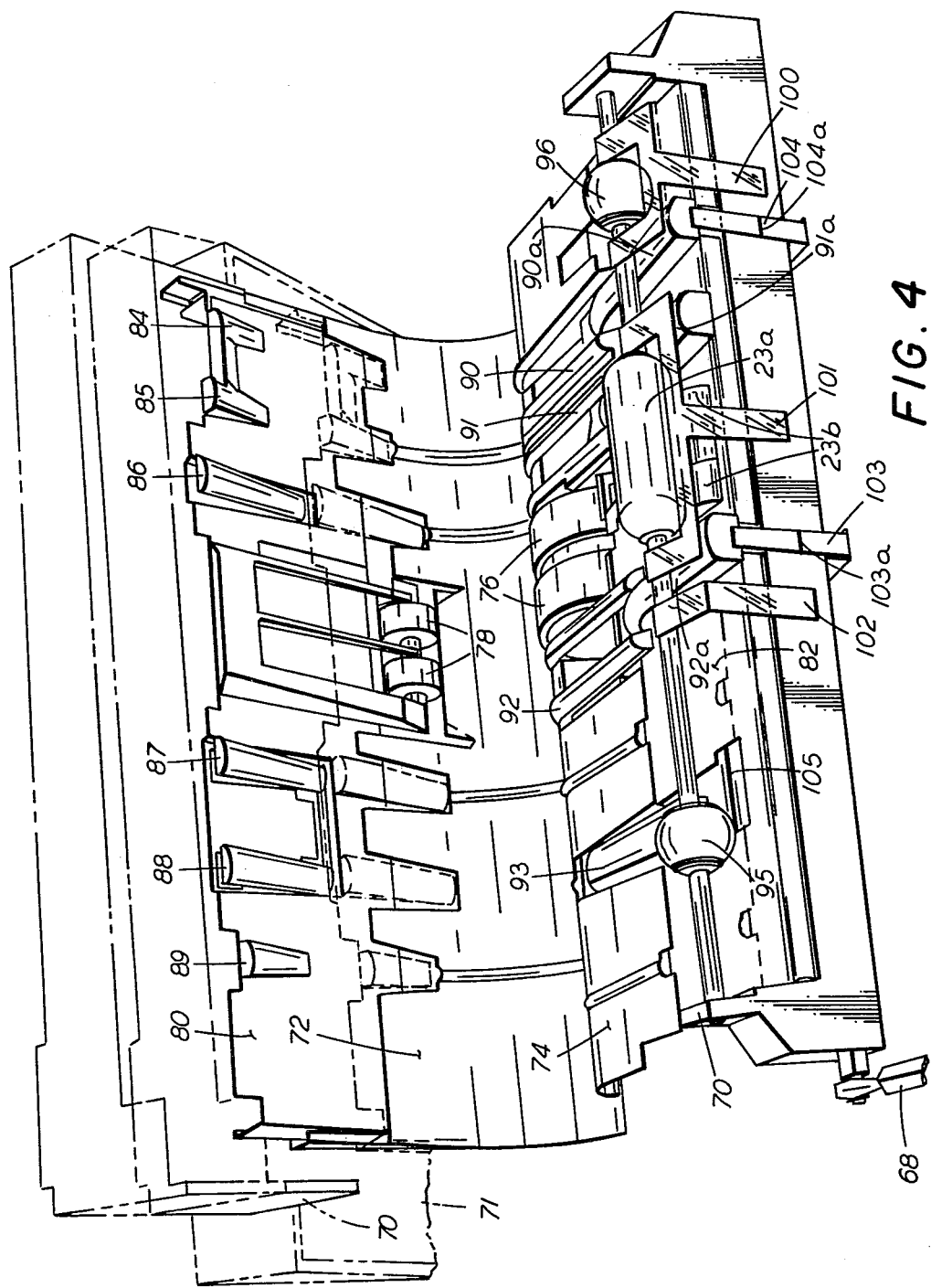

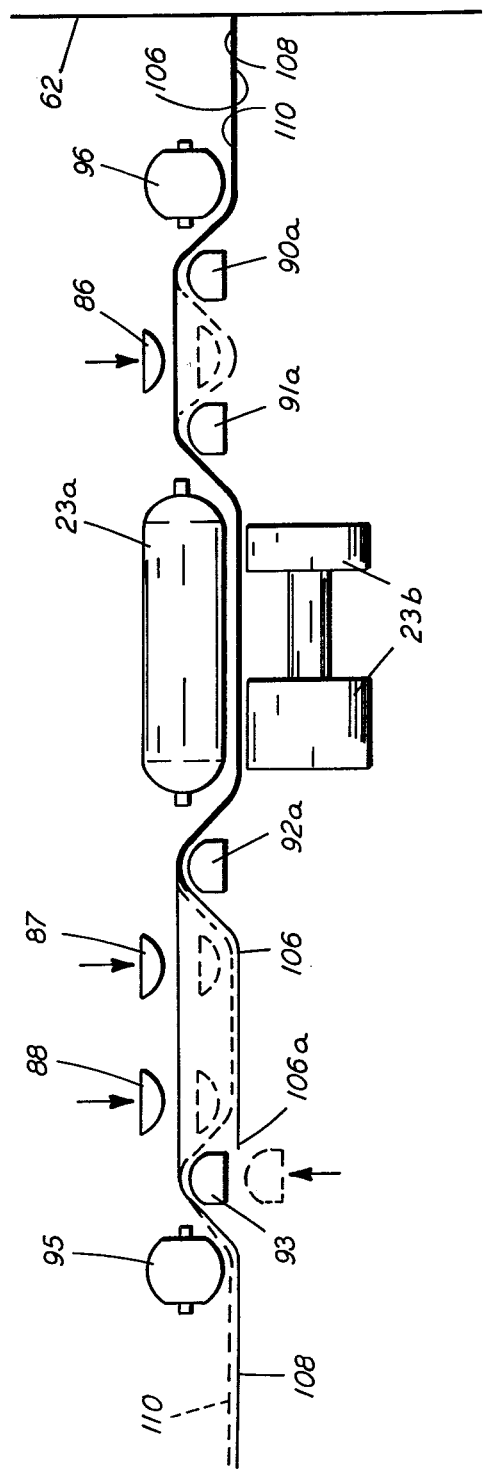

LARGE DOCUMENT RESTACKING SYSTEM

The present invention relates to document handling systems for copiers and more particularly relates to apparatus for restacking large individual document sheets in a recirculating document handler with an automatic special corrugation system enabling recirculative copying of such large document sheets.

As xerographic and other copiers increase in speed, and become more automatic, it is increasingly important to provide higher speed yet more reliable and more automatic handling of the original document sheets being copied, i.e. the input to the copier. It is desirable to feed, register and copy document sheets of a variety or mixture of sizes, types, weights, flexibility, materials, conditions and susceptibility to damage, yet with minimal document jamming, wear or damage by the document transporting and registration apparatus, even if the same documents are automatically fed and registered repeatedly.

In the description herein the term "document" or "document sheet" generally refers to a full size thin and generally flimsy sheet of paper, plastic, or the like individual physical image substrate being copied as an "original" (which may be a first original or a previous copy), as opposed to microfilm or electronic images, which are generally much easier to manipulate. Likewise as to "copies" and "copy sheets" onto which such "documents" are copied.

The present invention is particularly suitable for precollation copying, i.e. multiply automatically recirculated document copying provided by a recirculating document handler (RDH), although is also compatible with non-precollation or post-collation copying or semi-automatic document handling (SADH) requiring large document restacking. It is also applicable to the restacking of large flimsy copy sheets as in the duplex (buffer set) tray of a duplex precollation copier for such an RDH. Precollation, collation, or RDH copying, as it is variably called, is a known desirable feature for a copier, and provides a number of important advantages. In precollation copying any desired number of collated copy sets may be made by making a corresponding number of recirculations of the original document set in collated order past the copier imaging station (platen) and copying each document page only once each time it circulates past the imaging station. The copies thereby automatically exit the copier in precollated sets, and thus do not require subsequent collation in a sorter or collator. On-line finishing and/or removal of completed copy sets may thus be provided while further copy sets are being made from the subsequent circulations of the same document set.

However, a disadvantage of precollation copying systems is that the documents must all be repeatedly circulated for copying in a predetermined order by a number of circulations equivalent to the desired number of copy sets. Thus, increased document handling is necessitated for a precollation copying system, as compared to a post-collation copying system. Therefore, maximizing document handling automation while minimizing document wear or damage is particularly important in precollation copying.

A particular problem with precollation copying is that the document sheets must be continually seriatim fed out from one side of a stack of the documents in a tray and then restacked on the other side of the stack, usually on top of the stack. This restacking is particularly difficult. The restacking must be accomplished at the document recirculation rate and must return the documents in the proper stacked orientation for refeeding, including alignment between stack edge guides of the same document tray. The normal document recirculation rate should be at least equal to the associated copier's copy rate, e.g. 70–120 copies per minute, for full copier productivity. Restacking of copy sheets being duplexed has similar difficulties.

The problem of properly repeatedly restacking a series of documents one after another in a copier document stacking tray is much more than a problem in free fall dynamics. The trajectory of the document must be controlled without wearing or damaging the document so that the document consistently travels to and hits the proper landing area and stops flat in the aligned stack position so that it can be subsequently recaptured by the feeder and refed to be recirculated past the platen for copying at the proper position (alignment) on the platen. Document sheet restacking is affected by factors including especially the sheet's release point, cantilever (unsupported length), velocity, mass, stiffness, and "airfoil" shape including both induced and accidental curls on one or both axis of the sheet. Original documents are typically flimsy sheets which easily and typically change shape when released for restacking from air resistance, air flow lift, preset curl tendencies, etc. All of these characteristics affect the "flight" of the document being restacked and its settling position. Increasing the size and decreasing the thickness (and therefore stiffness) of the sheet greatly aggravates these restacking problems. Yet it is particularly desirable to avoid a restacking system which extends over the stack and therefore obstructs access to the stack area for loading, unloading, etc.. Also it would be clearly commercially undesirable to require one RDH for large documents and another for normal sized documents. Accordingly, heretofore recirculative document copying has been relatively limited in the size and weight or thickness of the document sheets which could be reliably multiply recirculated in an RDH.

Thus, although faster and more accurate automatic seriatim recirculation of the individual original document sheets is desired, it is difficult to accomplish without misstacking, jamming and/or damaging the documents where the documents comprise large flimsy sheets with an RDH also capable of reliably recirculating normal sizes of document sheets. Document sheets can vary widely in sheet size, weight, thickness, material, condition, humidity, age, etc. U.S. Pat. No. 4,286,870 issued Sept. 1, 1981 to M. Silverberg is noted as providing in Col. 14 an example of a table of standard document sheet sizes. To aggravate the problems, documents may have curls, wrinkles, tears, "dog-ears", cutouts, overlays, paste-ups, tape, staples, printed or adhesive areas, or other irregularities. Unlike copy sheets, which generally are all commonly cut from the same paper batch and therefore of almost exactly the same condition and size, original document sheets often vary considerably even if they are all of the same conventional "standard" size, (e.g. letter size, legal size, A-4, B-4, etc.) because they may have come from different sources and/or have variably changed size and stiffness under different age or humidity conditions, etc. Yet it is desirable to automatically or semi-automatically rapidly feed, register and copy sets of individual documents of different sizes, types, and conditions without document jams or document damage and with each document correctly and accurately restacked.

Examples of further details of some exemplary recirculating document handlers with which the present invention may be utilized are disclosed in U.S. Pat. Nos. 4,335,954 issued June 22, 1982 to Russell L. Phelps; 4,278,344 issued July 14, 1981 to R. B. Sahay; 4,270,746 issued June 2, 1981 to T. J. Hamlin; 4,076,408 issued Feb. 28, 1978 to M. G. Reid, et al.

Some examples of art specifically relating to document restacking control and/or document sheet corrugation include "Xerox Disclosure Journal" publications Vol. 6, No. 4, July/August 1981, p. 175; Vol., 6 No. 5, September/October 1981, pp. 237–238; Vol. 7, No. 2, March/April 1981, pp. 73–74; and Vol. 7, No. 4, July/August 1982, p. 277. Further details of said first-listed publication are in a corresponding U.S. Pat. No. 4,336,929 issued June 29, 1982 to E. W. C. Hanzlik. However, they both disclose variable corrugation of a document sheet with variations in sheet stiffness by a bottom sheet feeder rather than in restacking. Other document sheet feeders with corrugation are disclosed in U.S. Pat. No. 4,350,332 issued Sept. 21, 1982 to Clifford Knight, and 4,166,614 issued Sept. 4, 1979 to T. J. Hamlin et al. The latter also discloses another RDH example with which the present invention could be utilized.

Corrugation of sheets for feeding in general is, of course, known. Some examples include U.S. Pat. Nos. 2,423,691 to C. Domville et al.; 3,632,107 to K. Rehm et al.; and 3,790,157 to D. Crawford et al.

All references cited herein, and their references, are incorporated by reference herein for appropriate teachings of additional or alternative details, features, and/or technical background.

The present invention desirably overcomes or reduces various of the above-discussed problems.

A preferred feature disclosed herein is to provide, in a sheet stacking apparatus for stacking sheets in a sheet tray with stacking edge guide means for controlling the sheet stacking position, said stacking edge guide means being repositionable to accommodate stacking different normal sizes of sheets, said sheet stacking apparatus further including stacking feeding means for stacking the sheets in said tray within said stacking edge guide means by feeding each sheet in over the top of the stack from one edge thereof and releasing the sheet to stack, the improvement comprising: automatically variable corrugation stacking means for controlled stacking of large flimsy sheets in said tray for subsequent feeding from the stack compatibly with stacking said normal sheet sizes within said same tray and stacking edge guide means, wherein said stacking edge guide means are repositionable at said one edge in a direction opposite the feeding direction of said documents by said stacking feeding means sufficiently to accommodate said large document sheets, and wherein said variable corrugation stacking means comprises plural repositionable variable sheet corrugating members operatively connecting with said repositionable stacking edge guide means to change the corrugation of large flimsy sheets being stacked in said tray in response to said repositioning of said stacking edge guide means for stacking said large flimsy sheets in said tray such that said large flimsy sheets being restacked are sufficiently differently corrugated from said normal sheets to reliably stack in the same said tray.

Further features which may be provided by the apparatus disclosed herein, individually or in various combinations, include those in which said large flimsy sheets comprise Japanese B4 size documents; wherein said variable corrugation stacking means further includes additional variable sheet corrugating means increasing the corrugation of a large sheet automatically in response to its flimsiness and lateral dimension transverse the stacking feeding direction; wherein said stacking feeding means is connected to said stacking edge guide means so that repositioning of said stacking edge guide means for large sheets moves the position of said stacking feeding means relative to said tray in coordination with resetting said variable corrugation stacking means; and said variable corrugation stacking means changes both the location and configuration of at least a portion of said plural sheet deforming members, and wherein at least a portion of said deforming members extend into the restacking path of sheets being restacked adjacent said stacking feeding means and are repositioned in accordance with the position of said stacking edge guide means by being mechanically connected for common movement with said stacking edge guide means; and wherein at least one of said deforming members is automatically cammed into the stacking path of large sheets to provide additional corrugation thereof only in response to said repositioning of said stacking edge guide means sufficiently to accommodate said large sheets.

A particular feature is to provide a recirculating document handler wherein said apparatus comprises a recirculating document handler for seriatim recirculating original document sheets for precollation copying at a copier platen to and from a stack of said document sheets in a document tray without obstructing access to the document tray.

Various of the above-mentioned and further features and advantages will be apparent from the example described hereinbelow of specific apparatus and steps of operation. The invention will be better understood by reference to the following description of one specific embodiment thereof, which includes the following drawing figures (approximately to scale) wherein:

FIG. 4 is a partial perspective view of the system of FIGS. 1–3 with the restacking unit opened for illustration clarity and in its restacked (small document) position; and FIG. 5 is a schematic cross-sectional view of the document restacking path illustrating the corrugation of different documents in the embodiment of FIGS. 1–4.

Figure 1:
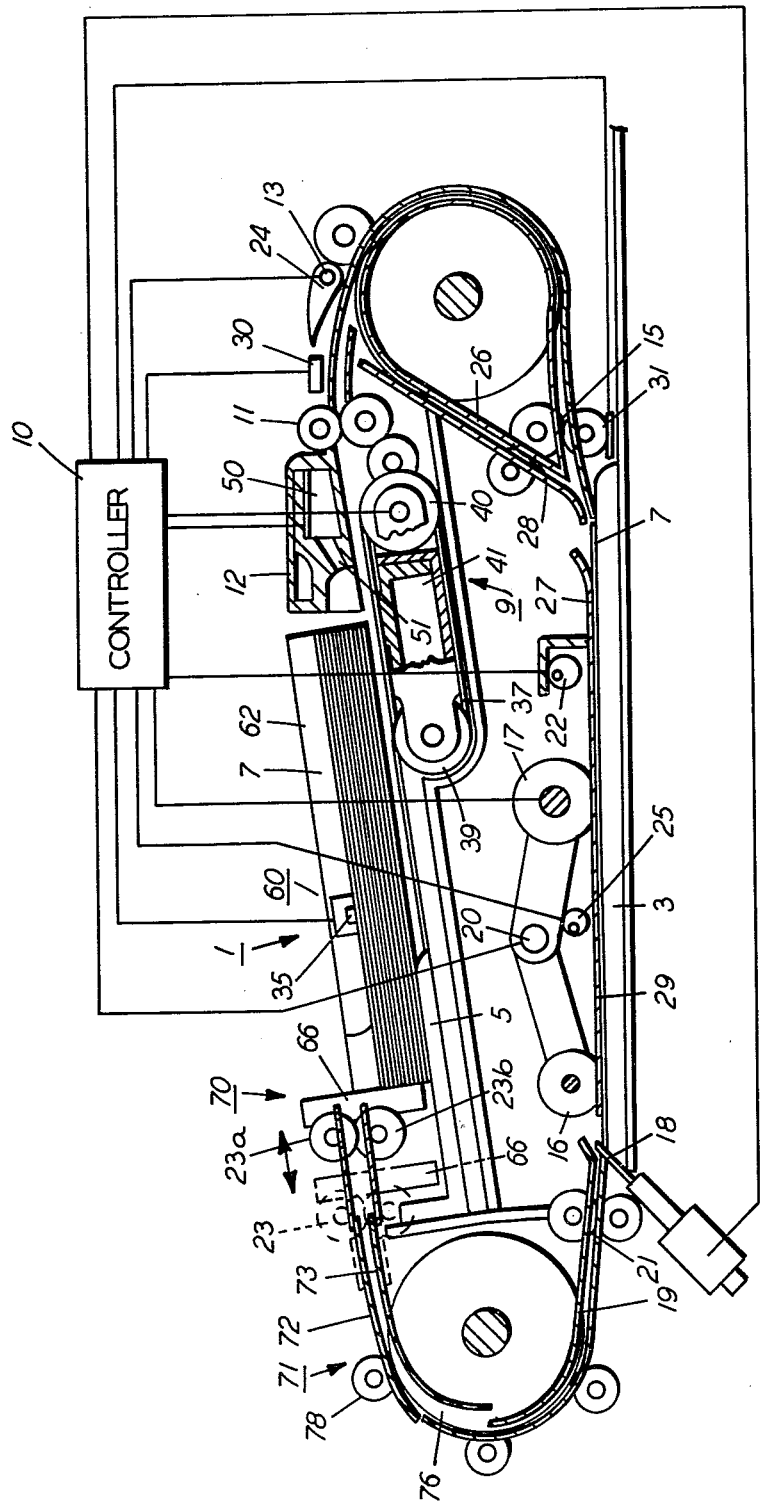
FIG. 1 is a partially schematic side view of an embodiment of an exemplary document handling apparatus utilizing the restacking system of the present invention.

The exemplary document sheet handling system disclosed in FIG. 1 may be conventional except as otherwise described herein, and may be mounted to any suitable or conventional copier. Disclosed here is an otherwise known over-platen recirculating document sheet handler (RDH) for precollation copying, in which a set of document sheets in conventional page order are stacked (loaded) into a restacking tray to be fed seriatim from the bottom of the stack by a vacuum belt or other suitable output feeder, preferably assisted by an air knife, both of which are at the front or downstream edge of the stack. Each sheet is fed out on to the copier platen, registered (including deskewing) and then copied once and returned via a restacking transport which feeds the returning sheet in over the top of the stack from the rear of the stack and releases the sheet to restack by settling down on top of the stack between laterally aligning edge guide members. Thus, the document sheets may be continuously recirculated in the same order as often as desired to produce the desired number of collated copy sheet sets.

Referring first particularly to FIG. 1, there is illustrated an exemplary automatic document handler 1 for installation over the exposure platen 3 of a conventional xerographic reproduction machine as described in the above-cited U.S. Pat. No. 4,270,746. The document handler 1 has a document tray 5 for supporting a stacked set of individual document sheets 7. The tray 5 is also the document restacking tray. A vacuum belt corrugating feeder system 9 is located below the front or forward area of the document tray for acquiring and corrugating the bottom document sheet in the stack and for feeding out that document sheet to a take-away set of roll pairs 11 after an air knife 12 has had time to help separate that bottom sheet from the rest of the stack. That document is then fed by the take-away roll set 11 through document guides 13 to a feed-roll set nip 15 and onto the platen of the copy machine for reproduction. A retractable registration edge 18 is provided here to register the lead edge of the document fed onto the platen.

The document sheet feeding registration and deskewing on the platen is accomplished by a pair of rollers 17 and a single roller 16. The initial feed-in of the document sheet over the platen 3 is controlled by a spaced pair of high friction drive rolls 17 which resist sheet skewing, but then both the final registration and the sheet ejection are controlled by a single downstream roller 16 located close to the registration edge 18 and centrally of the document sheet lead edge. The two upstream rollers 17 are automatically lifted up off of the platen glass 3 by cam 25 to allow the control of the sheet to be solely by the single downstream roller 16 during registration, thereby allowing the sheet to much more easily pivot for improved deskewing during registration.

Following exposure of the document, the registration edge 18 is retracted by suitable means such as the solenoid shown. The document is then fed off the platen by rollers 16 and 17 into guide 19 and (optionally) feed-roll pair set 21, and returned back to the top of the document stack of sheets 7 through baffles and feeders including a feed-roll set 23 providing a restacking feeder, as will be further described in detail herein.

When it is desired to present the opposite sides of duplex documents for exposure, the duplex document is fed from the stack 7 through guides 13 until the trail edge passes document diverter 24. Document diverter 24 is then rotated counterclockwise, i.e. into the document sheet path. The document direction is also then reversed and the document is diverted by diverter 24 through guides 26 and feed-roll set nip 28 onto the platen 3, as described in detail in the above-cited U.S. Pat. No. 4,278,344.

The document handler 1 is also provided with a sheet separator finger 35, as is well known in the art, to sense and indicate the documents to be fed versus those documents returned to the document handler, i.e. to count each completed document set circulation. Upon removal (feed out) of the last document sheet from beneath sheet separator finger 35, the finger 35 drops through a slot provided in the tray 5 to actuate a sensor indicating that the last document in the set has been removed from the tray. The finger 35 is then automatically rotated in a clockwise direction or otherwise lifted to again come to rest on top of all the documents in the stack for the start of the next circulation of the document set.

The document sheet separator-feeder 9 in FIG. 1 has a plurality of feed belts 37 supported for movement on feed belt rolls 39 and 40. Spaced within the run of the belts 37 there is provided a vacuum plenum 41 having openings therein adapted for cooperation with perforations in the belts 37 to provide a vacuum for pulling the bottom document in the document stack onto the belts 37. The plenum 41 is provided with a raised portion beneath the center belt 48 run so that upon capture of the bottom document in the stack against belts 37, a corrugation will be produced in the bottom sheet.

The air knife 12 of FIG. 1 includes a pressurized air plenum 50 having a plurality of separated air jet openings or orifices 51 to inject air between the bottom-most document pulled down against the feed belts and the documents thereabove to provide an air cushion or bearing between the stack and the bottom document to minimize the force needed for removing the bottom document from the stack.

Each bottom sheet in the bottom sheet feeding tray 5, i.e. the document being fed from the document tray 5 in the recirculating document handler 1, is automatically basically deskewed and side registered before being fed out of the tray by the conventional adjustable spaced pair of side guides of the tray. However, some skewing of the document can also occur during feeding of the sheet between the tray and the registration position on the platen. The present system prevents, to the extent possible, such further skewing of the document sheet during most of its feeding by skew-preventing transports. It then provides for unobstructed deskewing, only in the brief final movement of the document into its registration position over the platen, with a skew-allowing, transport (roller 16). To this end, the feed roller sets 11, 15, 17, 21, 23 and 28 of the document transport path are plural and commonly driven rollers or belts spaced transversely across the document path to resist non-uniform feeding or skewing of the document sheet.

Considering further this input feeding path for the document sheets 7 out from the stack thereof for copying on the platen, it may be seen that each document sheet as it is fed passes an upstream switch 30 (here adjacent the tray 5 output) and then a downstream switch 31 (here adjacent and just prior to the document being fed onto the platen 3). The exact location of these two switches 30 and 31 is not critical. The two switches are actuated in sequence by the document lead edge during the feeding of documents to be copied and before that document reaches the second and final platen transport (roller 16). Since the switches 30, 31 and guide 13 are stationary, the substantial sheet path distance between the two switches is constant. Thus the time period between actuation of switch 30 and the subsequent actuation of switch 31 is directly proportional to the actual velocity of the document sheet being fed to the platen transport. Accordingly, any variations in the document sheet feeding velocity, due for example to variations in line voltage, drive motor tolerances, drive train wear, sheet slippage, sheet drag, etc., will be directly measured. This information, preferably in the form of a conventional count of digital pulses from the conventional copier controller 10 clock source, may then be utilized for precise control of the platen transport drive as described herein and in the cited references.

After the document sheet 7 to be copied is fed past the second switch 31 it is fed onto the platen under a document clamp 27. This clamp 27 is a large generally planar light reflective surface member fully overlying the platen 3 to provide an optically uniform background against which the document may be copied. The clamp 27 is lifted by cams 22 during the feeding movement of the document (both before and after copying) to reduce the frictional resistance to feeding of the document. During copying the clamp 27 is lowered to flatten the document sheet against the platen.

Turning now to the novel variable restacking system disclosed herein, this system rapidly and reliably restacks sheets which are very thin and flimsy as well as being very large. Such thin sheets of paper may include those commonly referred to as "onion skin", "tracing" or "rice" paper. Thin paper sheets are often so thin as to be translucent, and have little inherent stiffness or beam strength due to their thinness, i.e. they normally readily deform randomly from their own weight and or air flows in any unsupported areas or portions of the sheet. A particularly difficult to handle sheet is the Japanese Industrial Standards (JIS) B4 standard size, utilized primarily in Japan, which is 257 by 364 millimeters in size (10.12 by 14.33 inches), and often very thin as well. Such sheets are notoriously difficult to handle except by very positive control, e.g. feeding pneumatically or mechanically within fixed guides or baffles. Accordingly, it was heretofore considered impossible to provide automatic rapid precollation recirculative copying of such sheets as original documents with an RDH also capable of conventional recirculation of normal documents. Yet an embodiment of the disclosed system has been demonstrated to successfully restack 70 document sheets per minute in an RDH unit for a wide range of documents including very light-weight sheets and a wide range of sheet sizes encompassing JIS B4 noted above and also ISO and JIS size A4 (210 by 297 mm or 8.27 by 11.69 inches) at the large end, and JIS B5 (182×257 mm) (7.17×10.12 inches) at the small end of the size range.

In regard to sheet thickness and stiffness, it should also be noted by way of background that this is not normally generally expressed or measured directly. Rather sheet thinness is basically inherent and expressed in the weight of the paper sheet. For example, in the United States this paper weight is expressed as the "basis weight" of one ream (500 sheets) of paper in a standard uncut size for that particular grade of paper. Thus for "bond" grade paper (high grade writing or printing paper) the standard U.S. basis weights are 13, 16, 20, 24, 28, 32, 36 and 40 pounds (with 13 pound paper being the thinnest) for a 17 by 22 inch standard uncut ream size for bond grade. [The metric equivalent weights are expressed in "grammage" and are 49, 61, 75, 90, 105, 120, 135 and 151 grams per square meter.] Of these weights, "20 pound bond" is generally considered to be the normal or conventional weight in the U.S. but not in Japan, where lighter sheets are more typical. For "book" type paper (a general term for other coated and uncoated papers) the normal "basis" weights in the U.S. run from 30 to 120 pounds for a (larger) standard 25 by 38 inch ream [with metric equivalents running from 44 to 178 gsm].

Lighter sheets require less material to produce and require less postage, storage space and weight per comparable sheet size. Larger sheets enable more information content per page, and therefore less pages, of course, in certain applications. However, where this is not a factor, e.g. single page letters, then smaller sheets are more desirable. Thus rising materials and energy costs may encourage a trend towards lighter and more variable document sizes. Also, greater international trade and communications between countries with different standard sheet sizes and weights has led to more mixtures of different documents requiring copying. The disclosed system is intended to reliably handle the lightest and thinnest of standard documents, and even lighter documents.

Turning now to the specific example of one variable restacking system disclosed herein, and with particular reference to FIGS. 2–5 as well as FIG. 1, it is important to note first that the present system is intended to reliably stack a wide range of sheet sizes and basis weights within a defined restacking tray area for recirculation. That restacking tray area is defined by a system of restacking edge guides 60. These include a fixed side guide 62 at the registration side of the RDH corresponding to the registration side of the copier platen (here the rear edge as the operator faces the front of the copier and RDH unit). The front edge guide is a movable or resettable side guide 64 which is reset to the dimension (from the fixed rear side guide 62) of the particular set of documents being recirculated. Here that dimension is the length of each sheet of paper since the documents are being recirculated edgewise or long edge first.

The restacking edge guides 60 are also reset for the opposite (orthogonal) dimension of the documents by repositioning a movable rear side guide 66 to the appropriate spacing from the front of the tray which is defined here by the fixed position of the front wall of the air knife unit 12. This is referred to as the rear guide 66 here (even though it is on the left-hand side) because it determines the final settling position of the rear edge of the document sheet during restacking. This is because the document is being restacked in a feeding direction in through and over this rear guide 66.

The rear guide 66 may be reset in various ways. Here, as particularly shown in FIGS. 2–3, the rear guide 66 is reset manually by the operator pressing a release button 67 to unlock and move a slide 68. The slide 68 is in turn directly mechanically connected to a movable restacking unit 70, as will be further described herein, which includes the rear edge guide 66.

As shown schematically in FIG. 1 and in further detail in the other figures, the entire movable restacking unit 70 slides or repositions telescopically with respect to a fixed restacking unit 71. The fixed unit 71 includes a fixed upper baffle 72 and a fixed lower baffle 74 defining an initial restacking path therebetween. Closely parallel and telescopically movable relatively thereto is a corresponding movable upper baffle assembly 80 and a movable lower baffle assembly 82, which are integral parts of the movable restacking unit 70. When the unit 70 is closed, for normal operation, the two movable baffle assemblies 80 and 82 are spaced apart but locked together for common movement and therefore are commonly repositioned by the buttons 67 and slide 68. The baffle units may be conventional document path confining and guiding members comprising here metal or plastic sheets. They may have integral formed ribs, as shown.

Directly fastened near the front (downstream or sheet exit end) of the movable lower baffle assembly 82 and therefore also a part of the movable restacking unit 70, is the final restacking feeder unit 23. It comprises a wide hard (metal) upper cylindrical idler roller 23a and two lower mating elastomer-surfaced driver rollers 23b. The two rollers 23b are narrow and spaced apart to avoid ironing in a wrinkle in the sheets from the pinch with the roller 23a. Guide-in ramps are provided on the opposing baffles to insure that the lead edge of the document is fed into the driving nips between roller 23 and both rollers 23b.

Figure 2:
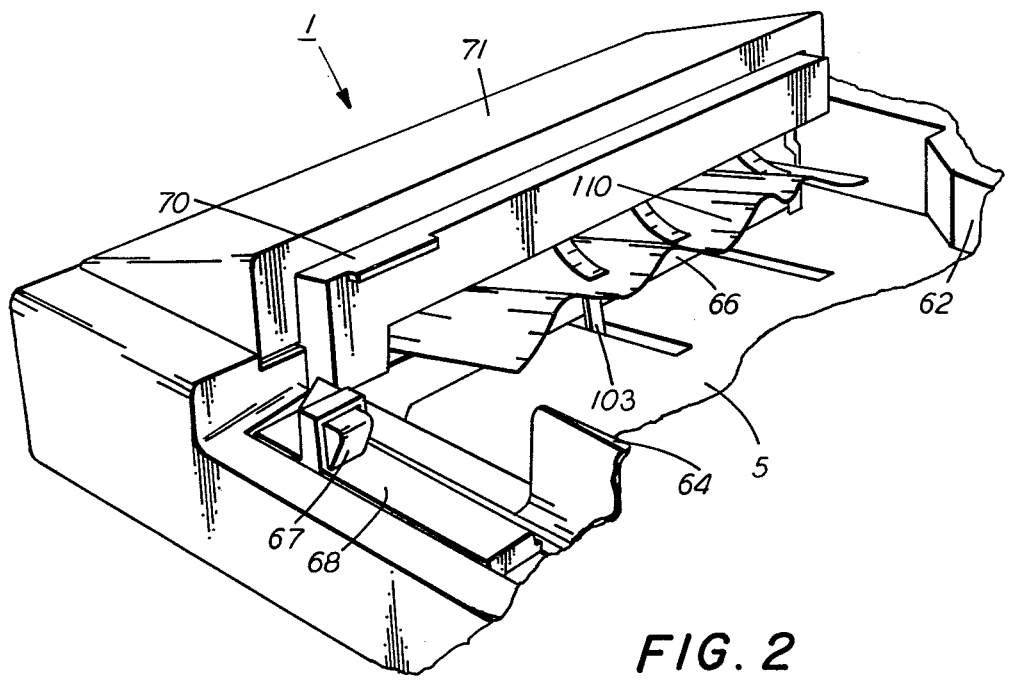
FIGS. 2 and 3 are both enlarged perspective views of the restacking portion of the embodiment of FIG. 1, shown reset in two different operating states, for larger and smaller documents, respectively, and each showing a document being restacked.
Figure 3:
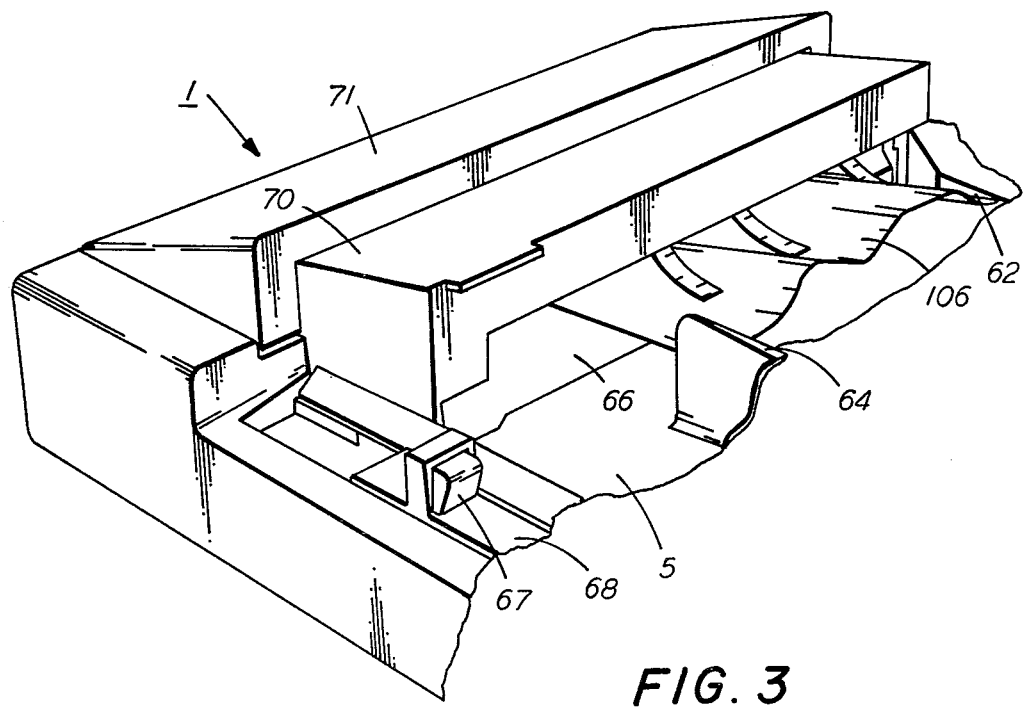

Resetting of the rear guide 66 of the restacking stack tray from a small document restacking position as in FIG. 3 to a large document restacking position as in FIG. 2, automatically, in coordination, also resets the positions of all the other elements of the movable restacking unit 70, including the upper movable baffle assembly 80, the lower movable baffle assembly 82 and the restacking feeder unit 23. Note the dashed line position of these major components in FIG. 1, and in FIG. 4 the dashed line position of the upper and lower movable baffle assemblies 80, 82.

The resetting of the movable restacking unit 70 to a large document position accomplishes a very different extent and type of corrugation of the sheet being restacked, as illustrated in FIG. 5 and by the differences between FIGS. 2 and 3. Referring particularly to FIG. 4, but also to FIG. 5, it may be seen that the movable upper baffle assembly 80 has mounted thereto and movable therewith, six upper fingers 84, 85, 86, 87, 88 and 89. Of these fingers, the finger 84 on the inboard or registration side is a lead-in ramp or deflector to prevent lead edge stabbing damage and to hold the inboard edge of the document down, primarily to control its position relative to a sheet sensor in the upper baffle assembly 82, and integral finger 85 which provides a lead-in to roller 96. The next three upper fingers 86, 87 and 88 are mounted to the movable upper baffle assembly 80 at their upstream ends and weighted so as to variably corrugate sheets to an extent dependent upon the stiffnes or weight of the sheet. Finger 89 is also primarily a lead-in (to roller 95).

The fingers 87 and 88 are spaced apart but integrally mounted for common pivotal movement and are commonly weighted for variable, or no, corrugation of the document sheet by both fingers 87 and 88 depending on the sheet stiffness. This weight or pressure with which the fingers 86 and 87–88 press down on the document sheet being restacked is in the range of approximately 10–20 grams. In contrast, the fingers 84, 85 and 89 are integrally mounted fixed relative to the movable upper baffle assembly 80 and therefore extend down into the document sheet path vertically by a fixed distance independent of document sheet stiffness or weight. However the horizontal position of all of these fingers changes when the unit 70 is repositioned, and therefore their sheet corrugating positions change by movement to different positions along the document restacking path. The furthest outboard finger 89 on the movable upper baffle assembly 80 is fixed thereto like the fingers 84 and 85, but is positioned to be engaged only by sheets of the largest dimension transverse the sheet feeding direction.

Turning now to the corresponding and mating set of lower corrugating finger units on the lower baffles, these comprise here three telescoping finger units 90, 91 and 92 and an outboard pivotal finger 93.

The upstream ends of parts of the finger units 90, 91, 92, and the finger 93, are all pivotally mounted to the fixed lower baffle 74 and therefore do not move with differences in document size. However, it may be seen that the finger units 90, 91 and 92 have telescoping raised central portions 90a, 91a and 92a which the actual corrugating members and which are mounted to the movable lower baffle assembly 82 of the movable restacking unit 70. Thus these central portions 90a, 91a and 92a are repositionable to extend the overall length of the fingers 90, 91 and 92 to form, in effect, separate but functionally interconnecting sheet guide surfaces when the movable restacking unit 70 is moved outwardly (downstream) for smaller documents. In that mode the upstream portions of the finger units 90, 91 and 92 provide a controlled lead-in guide or ramp to the corrugating fingers 90a, 91 and 92a so that a lead edge of a sheet will not catch on the upstream end of a finger 90a, 91a or 92a. Conversely, when the movable restacking unit 70 is reset rearwardly for large documents the central portions 90a, 91a and 92a telescopically retract within the fixed portions thereof to form a more integral finger unit. The upstream fixed ramp portion for both fingers 90 and 91 here is a single unit, with a concave central portion to mate with overlying finger 86.

Considering now the relationship between the respective upper and lower fingers, it is first noted that the upper fingers do not extend as far horizontally as the lower fingers. Also, a conventional active static eliminator may be located in front of the upper fingers. However, the upper and lower fingers are positioned and shaped to interdigitate with one another to achieve the desired corrugation, i.e. to extend vertically past one another, but be laterally offset. Thus, when the upper baffles are down in their operating position the upper fingers 85, 86 and 88 are respectively adjacent the inside edges of fingers 90a, 91a and 93, while fingers 87 and 89 are adjacent the outside edges of fingers 92a and 93, respectively. Thus, finger 93, when it is operative, extends up between fingers 88 and 89. However, since the latter two fingers are shorter, an idler roller 95 on the same shaft as roller 23a provides the downward corrugation of a sheet extending outboard of finger 93. A similar roller 96 is at the inboard side of the outer end of lower finger 90a and is directly in front of upper finger 85. The rollers 95 and 96 assure desired holddown of both edges of the largest sheet being restacked.

It will be seen that all of the above-described corrugator members here are provided by elongate plastic fingers extending in the sheet feeding direction and also increasing in thickness and extent of vertical intersection into the sheet path in the sheet feeding direction. Expressing it another way these fingers provide gradually sloping ramps into the sheet path with the forward motion of the document sheet. All of the fingers have smooth rounded semi-cylindrical upper surfaces engaging the paper. The finger lead edges are recessed below the plane of the baffles to avoid snagging or catching the sheet.

It will be appreciated that the vertical extent of each finger above its baffle surface, i.e. the extension of the finger from one baffle toward the other opposing baffle, determines the extension of the finger into the sheet path and therefore the amount of corrugation it provides.

As the sheet is finally ejected from the movable restacking unit 70 into the tray the upper surface of the sheet is also engaged by lightweight highly flexible clearer plastic deflector tabs 100, 101 and 102 similar to those disclosed in the above cited Xerox Disclosure Journal publication, Vol. 6, No. 5, pp. 237-238. These are lightly spring-loaded downwardly by their resiliency to help push down (settle faster) the trail edge of the sheet after the trail edge clears the roller unit 23 and the downstream edges of the lower corrugating fingers.

Two vertical rear edge aligning fingers 103 and 104 are provided at the front surface of the movable restacking unit 70 to provide the actual guide stack stop or guide, i.e. the movable rear guide 66 alignment surface. These vertical fingers 103 and 104 extend from below the tray surface level up to the front of two of the lower corrugating fingers 90 and 92a. They have intermediate undercut notches 103a and 104a to resist upward movement (as by air knife fluttering) of the trail edges of already restacked sheets.

An additional corrugation structure and function is moved into the sheet path for increased corrugation to improve the restack performance of large, Japanese B4 size, document sheets. This additional corrugation feature is cammed into position by the movement of the movable restacking unit or corrugation unit 70 into the B4 document size position. Here this is provided by automatic camming of lower finger 93 up into the path of large documents (only) adjacent (but not at) the outboard end of the large documents. By pivotally mounting the upstream end of finger 93 to the lower fixed baffle 74 and providing a slot in both lower baffles through which finger 93 normally drops, finger 93 is normally effectively out of the document path. (Particularly by defining the document path as between the planes of the tangents of the active surfaces of the other fingers.) A ramp or cam surface under the outer end of finger 93 is adapted to be engaged by a wire rod cam 105 on the lower movable baffle assembly 82 only when the latter is pushed back into its large document position. This lifts the outer end of finger 93 into the sheet path only when the restacking unit is in the B4 document position. Expressing it another way, the lower corrugating finger unit 93 is differently mounted and functionally different from the other fingers in that it is mechanically cammed in or out of the sheet path by the movement of the movable restacking unit 70 into or out of the largest document size position. This corrugation feature is retracted for other document sizes to maintain a desirable corrugation shape for all document sizes suited to the document size. Thus, if the finger 93 were not cammed out of the sheet path for other documents it would undesirably lift up the outer edges or ends of A4 or U.S. 8½×11 size document sheets.

Functionally describing the above structure and its operation, it may be seen that most of the elements providing the corrugation of the sheet as it restacks, i.e. the corrugation unit, are moved and changed as a function of the document size, in such a way as to minimize the uncontrolled flight of the sheet during restacking and so as to improve restacking reliability.

Expressing it another way the system automatically changes the corrugation amplitude and the corrugation positions in response to the movement of the corrugating unit for different paper sizes. This automatically provides different corrugations for different sheet sizes, which automatically compensates for the fact that different sheet sizes must be projected (cantilevered) different distances out over and into the document tray.

Additionally variable corrugation features are provided in combination with and in addition to but independently of the actuation of said variable document size variable corrugation features. This additional variable corrugation changes the document sheet corrugation amplitude as a function of paper stiffness, as described above in connection with fingers 86, 87 and 88. The amount of corrugation of lightweight (low stiffness) documents is increased automatically to improve restack performance. Correspondingly the amount of corrugation of heavy weight (high stiffness) documents is automatically reduced to minimize document damage while still maintaining restack performance. This change in corrugation with document stiffness is accomplished, as described above, with weighted movable corrugation elements which respond automatically to paper stiffness without any operator involvement or sensing systems being required.

Turning now to FIG. 5, this is intended to provide an illustration of the above-described apparatus in its corrugating function for clarity. There is shown in FIG. 5 a cross-section of the sheet path and the respective sheet corrugations adjacent the sheet output for three different sheets, a small thin (flexible) sheet 106, a large (B4 size) but relatively stiff sheet 108 and a large and very flimsy B4 size sheet 110. The stiffer sheets will all have the same basic output corrugation on the right hand side and therefore are superimposed there. As shown in the dashed line sheet positions, in the case of a very thin (flimsy) sheet 110, the pivotable weighted upper fingers 86, 87 and 88 additionally corrugate this flimsy sheet with their weight, whereas with a stiffer sheet they ride on top of and are held up by, the sheet beam strength. The actual position will be intermediate the two extreme positions shown in most cases. Because the restacking unit is shown in FIG. 5 reset for B4 size sheets, this finger 93 is shown in solid lines in its raised position (raised from its dashed line position). Note that for the large flimsy sheet 110 this creates an upward corrugation of the sheet closely adjacent to the downward corrugation by the upper finger 88. For either a flimsy or stiff large sheet an upward corrugation by finger 93 is followed by a downward corrugation of the end of the sheet by roller 95.

Note that the small sheet 106 ends at a position 106a which is under the fingers 87 and 88 but is not over (i.e. is short of) the lower finger 93.

Thus the end area of this shorter sheet 106, even though it is stiffer, can be deflected down by the fingers 87 and 88 because it is unsupported and cantilevered from finger 92a. The same is true for longer sheets whenever the finger 93 is out of the sheet path (in its dashed-line position).

It will also be noted that the additional corrugation provided by the weighted corrugating finger 86, 87 and 88 to flimsy sheets is corrugating the flimsy sheet downwardly into a trough between two directly adjacent upwardly corrugating members provided by lower baffle fingers 90a, 91a, 92a and also 93 when it is raised. This opposite and directly adjacent corrugation effect increases the total or peak to peak vertical extent of the resulting adjacent "waves" in the sheet and thereby multiplies several times the stiffness imparting effect or resultant beam strength compared to single (widely spaced) unidirectional corrugations.

The embodiment disclosed herein, and others, are intended to provide a more positive and reliable yet gentle and automatic control of the orientation and driving and restacking forces on the document sheet during the entire restacking process of feeding, ejecting and "flying" the document into its proper restacking position. It will also be appreciated that the embodiment described herein is merely exemplary and that other variations, modifications, refinements, or alternative embodiments may be made by those skilled in the art from this teaching. They are intended to be encompassed by the following claims.

What is claimed is:

1. In a sheet stacking apparatus for stacking sheets in a sheet tray with stacking edge guide means for controlling the sheet stacking position, said stacking edge guide means being repositionable to accommodate stacking different normal sizes of sheets, said sheet stacking apparatus further including stacking feeding means for stacking the sheets in said tray within said stacking edge guide means by feeding each sheet in over the top of the stack from one edge thereof and releasing the sheet to stack, the improvement comprising:
automatically variable corrugation stacking means for controlled stacking of large flimsy sheets in said tray for subsequent feeding from the stack compatibly with stacking said normal sheet sizes within said same tray and stacking edge guide means,
wherein said stacking edge guide means are repositionable at said one edge in a direction opposite the feeding direction of said documents by said stacking feeding means sufficiently to accommodate said large document sheets,
and wherein said variable corrugation stacking means comprises plural repositionable variable sheet corrugating members operatively connecting with said repositionable stacking edge guide means to change the corrugation of large flimsy sheets being stacked in said tray in response to said repositioning of said stacking edge guide means for stacking said large flimsy sheets in said tray such that said large flimsy sheets being restacked are sufficiently differently corrugated from said normal sheets to reliably stack in the same said tray.

2. The sheet stacking apparatus of claim 1 wherein said large flimsy sheets comprise Japanese Industrial Standards B4 size sheets.

3. The sheet stacking apparatus of claim 1 wherein said apparatus comprises a recirculating document handler for seriatim recirculating original document sheets for precollation copying at a copier platen to and from a stack of said document sheets in a document tray without obstructing access to the document tray.

4. The sheet stacking apparatus of claim 1 wherein said variable corrugation stacking means further includes additional variable sheet corrugating means increasing the corrugation of a large sheet automatically in response to its flimsiness and lateral dimension transverse the stacking feeding direction of said document sheets.

5. The sheet stacking apparatus of claim 1 wherein said stacking feeding means is connected to said stacking edge guide means so that repositioning of said stacking edge guide means for large sheets moves the position of said stacking feeding means relative to said tray in coordination with resetting said variable corrugation stacking means.

6. The sheet stacking apparatus of claim 1 wherein said variable corrugation stacking means further includes additional variable sheet corrugating means for increasing the corrugation of a large sheet automatically in response to its flimsiness and lateral dimension transverse its stacking feeding direction,
wherein said stacking feeding means is connected to said stacking edge guide means so that repositioning of said stacking edge guide means for large sheets also moves the position of said stacking feeding means relative to said tray in coordination with said resetting of said variable corrugation stacking means, and
wherein said large flimsy sheets include Japanese B4 size sheets.

7. The sheet stacking apparatus of claim 5 wherein said variable corrugation restacking means further includes additional variable sheet corrugating means increasing the corrugation of a large sheet automatically in response to its flimsiness and lateral dimension transverse its restacking feeding direction.

8. The recirculating document handler of claim 7 wherein said large flimsy sheets comprise Japanese B4 size documents.

9. The sheet stacking apparatus of claim 2 wherein said variable corrugation stacking means changes both the location and configuration of at least a portion of said plural sheet deforming members, and wherein at least a portion of said deforming members extend into the document restacking path of document sheets being restacked adjacent said stacking feeding means and are repositioned in accordance with the position of said stacking edge guide means by being mechanically connected for common movement with said stacking edge guide means, and wherein at least one of said deforming members is automatically cammed into the document restacking path of large document sheets to provide additional corrugation thereof only in response to said repositioning of said stacking edge guide means sufficiently to accommodate said large document sheets.

10. The sheet stacking apparatus of claim 9 wherein said variable corrugation stacking means further includes additional variable sheet corrugating means for increasing the corrugation of a large document sheet automatically in response to its flimsiness.

11. The sheet stacking apparatus of claim 9 wherein said at least one deforming member is cammed into the restacking path only for large flimsy document sheets comprising Japanese Industrial Standards B4 size documents.

* * * * *